US009041560B2

(12) United States Patent
Venkataswamy et al.

(10) Patent No.: US 9,041,560 B2
(45) Date of Patent: May 26, 2015

(54) SYSTEM AND METHOD OF DISPLAYING A RUNWAY TEMPORARILY DISPLACED THRESHOLD AND AN AIRCRAFT LANDING AIMING POINT

(75) Inventors: Sadguni Venkataswamy, Karnataka (IN); Prashant Prabhu, Karnataka (IN); Ravindra Jayaprakash, Karnataka (IN); Anil Kumar Songa, Karnataka (IN); Mallikarjuna Narala, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 191 days.

(21) Appl. No.: 13/454,684

(22) Filed: Apr. 24, 2012

(65) Prior Publication Data

US 2013/0278444 A1 Oct. 24, 2013

(51) Int. Cl.
*G01C 21/00* (2006.01)
*G08G 5/00* (2006.01)
*G08G 5/02* (2006.01)

(52) U.S. Cl.
CPC ............ *G08G 5/0013* (2013.01); *G08G 5/0021* (2013.01); *G08G 5/025* (2013.01)

(58) Field of Classification Search
USPC ............ 340/971, 972, 959; 701/3, 4, 14, 455, 701/18, 7, 16; 715/764
See application file for complete search history.

(56) References Cited

U.S. PATENT DOCUMENTS 7,769,501 B2 8/2010 Lusardi et al.
7,965,223 B1 6/2011 McCusker
8,046,165 B2 10/2011 Sacle et al.
8,112,188 B2 2/2012 Rouquette et al.
8,200,378 B1 * 6/2012 Chiew et al. ....................... 701/4
8,306,745 B1 * 11/2012 Clark et al. ................... 701/455
8,321,078 B2 * 11/2012 Vial ................................ 701/14
8,462,019 B1 6/2013 VanDerkamp et al.
2007/0088491 A1 4/2007 He
2011/0202206 A1 8/2011 Karthikeyan et al.
2011/0264313 A1 10/2011 Sampath
2013/0027226 A1 1/2013 Cabos
2013/0036376 A1 * 2/2013 Williams ...................... 715/764
2013/0120166 A1 * 5/2013 Kommuri et al. ............. 340/971
2013/0179009 A1 * 7/2013 Gershzohn ........................ 701/3

FOREIGN PATENT DOCUMENTS

EP 2234088 A2 9/2010
EP 2317488 A2 5/2011

(Continued)

OTHER PUBLICATIONS

EP Search Report for Application No. EP 13 162 816.6 dated Feb. 4, 2014.

(Continued)

*Primary Examiner* — Benjamin C Lee
*Assistant Examiner* — Israel Daramola
(74) *Attorney, Agent, or Firm* — Ingrassia Fisher & Lorenz, P.C.

(57) ABSTRACT

A system and method are described for receiving a NOTAM and storing information relating to the distance of a temporarily displaced threshold for a runway. When that runway is selected for approach and landing, the temporarily displaced threshold and new aiming point are automatically displayed. The change made to the display using NOTAM data can be indicated to the pilot by distinct symbology or particular color, or by using an icon or an annunciation.

14 Claims, 10 Drawing Sheets

(56) References Cited

FOREIGN PATENT DOCUMENTS

| | | | |
|---|---|---|---|
| JP | 8096151 | | 4/1996 |
| JP | 11353600 | | 12/1999 |
| WO | 2011128835 | A2 | 10/2011 |

OTHER PUBLICATIONS

Standar, A.; Digital AIM Project, The D-AIM Project, LFV Sweden—EUROCONTROL project running 2007-2009.

xNOTAM Trial Presentatoin; DNSWG, Washington, Dec. 5, 2007; European Organisation for the Safety of Air Navigation.

Katz, P.; Knowing the NOTAMs, Don't underestimate their importance; Plane & Pilot, Saturday, Mar. 1, 2008.

Institute of Flight Systems and Automatic Control; AMDB/xNOTAM Study, Study onthe applicability of the xNOTAM concept for updating Airport Mapping Database (AMDB) applications, Overview.

EP Communication for Application No. EP 13 162 816.6-1803 dated Mar. 13, 2014.

* cited by examiner

SYSTEM AND METHOD OF DISPLAYING A RUNWAY TEMPORARILY DISPLACED THRESHOLD AND AN AIRCRAFT LANDING AIMING POINT

TECHNICAL FIELD

The exemplary embodiments described herein generally relate to displaying a temporarily displaced threshold and aiming point, and more particularly to updating displayed runway markings modified in response to a Notice to Airmen (NOTAM).

BACKGROUND

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

Whether using advanced instruments or acquiring the runway visually, the pilot is provided or determines the runway threshold (end of the usable runway) and aiming point (for the aircraft). The aiming point is further down the runway so the runway between the threshold and the aiming point is available for touchdown in case the pilot undershoots the aiming point.

Synthetic vision systems are currently certified for situation awareness purposes in commercial and business aviation applications with no additional landing credit for going below published minimum. Such a display system, when used in conjunction with Enhanced Vision Systems, is known to improve a pilot's overall situational awareness and reduce flight technical errors.

NOTAMs bring information about sudden/immediate changes and temporary changes that will exist for a short time only. The legacy NOTAM messages (the current system of a text note which can be distributed by basic teletype networks such as the Aeronautical Fixed Telecommunication Network) largely escape the digital processing data chain and as a result the contents of a database on-board the aircraft may be incorrect (superseded by NOTAM). Display Systems such as the Synthetic Vision Systems (SVS), Airport Moving Maps, top down and side view maps may not be displaying up to date or complete data. Furthermore, current Advisory and Warning systems like Smart Landing/RAAS may mislead the pilot based on database information on which they provide an alert due to not being in sync with the temporary NOTAM, and for not considering the full runway length available in accordance with the airport database, and therefore, will raise an alert when the pilot tries the new computed aiming point. In doing so, the display is providing misleading or incomplete data to the pilot. If the threshold of the runway is temporarily displaced, the display still continues to show full runway length available. Though the information might be available through ATIS or even Digital NOTAMs on a separate display, there are quite a few opportunities for the pilot to miss the data.

Pilot workload is increased as he has to take a note of this or visualize the effect of the change. For example, manufactures of SVS systems are seeking lower landing minima (Operational Credit) using improved symbology. When the aircraft is on the approach path with SV terrain on, the pilot can visually use the flight path symbol (FPS) and flight director (FD) alignment with the aiming point markers of the arrival runway to verify that the aircraft continues to move towards that point of runway during the approach. However, if the runway threshold is displaced by a NOTAM, the pilot will need to mentally visualize where the aiming point markers will now be depicted based on the NOTAM, which not only increases the pilot work load, the pilot estimate of aiming point markers may not be accurate. In the worst case, the pilot may aim at the original aiming point markers if he missed the NOTAM. This may put the aircraft glide path in the way of obstructions or the aircraft may land on the part of the runway that is not capable of handling aircraft landings. Therefore, depicting the Actual runway (incorporating the NOTAM changes) and notifying the pilot that the information came from a NOTAM is all the more important for SVS. NOTAMs are often hard to read and sometimes there are so many of them that don't apply to pilots that they just ignore all of them. Failure to get the current pertinent NOTAMs may result in undesired results.

NOTAMs provide information about immediate and temporary changes. Determining which NOTAM is applicable to a given flight typically is not easy and requires a major effort on the part of the pilot or, in the case of airline operations, the personnel who put together the route documents for the pilot's flights.

Current display systems, for example, Synthetic Vision Systems, Airport Moving Maps, Weather displays, and Interactive Navigation systems are not displaying current data, but are displaying misleading or incomplete data to the pilot. If a runway or part of a runway is temporarily closed, the display still continues to show full runway length available for the pilot. Though the information might be available through ATIS or even Digital NOTAMs on a separate display, having the necessary information on more than one display increases the chance the pilot might not notice the information. Also pilot workload is increased as he has to take a note of the information on multiple displays and visualize the effect of the change.

The legacy NOTAM messages largely escape the digital processing data chain and as a result, the contents of a database on-board the aircraft may be 'superseded by NOTAM'. In known systems, the task of remembering which information has been overridden becomes a task for the pilots.

Accordingly, it is desirable to provide a system and method for improving the ability to fly low altitude, low visibility approaches including insuring accurate data input including NOTAMS to the pilot. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A method and system are provided for receiving a NOTAM and storing information relating to flight information, e.g., the distance of a temporarily displaced threshold for a runway. When that runway is selected for approach and landing, the temporarily displaced threshold and new aiming point are automatically displayed.

In an exemplary embodiment, a method of displaying information on a display of an aircraft, comprises receiving NOTAM data; storing the data; selecting a desired flight path; identifying visual information related to the flight path; modifying the visual information in response to the NOTAM data; and displaying the modified visual information.

In another exemplary embodiment, a system within an aircraft, the system comprises a database; a display; and a flight management system coupled to the database and the display, and configured to store data from a received NOTAM; select a target runway having markers indicating the location of a runway threshold, and an aiming point on the runway for the aircraft in performing a landing; determine the positioning of modified markers, and a modified aiming point to be displayed in accordance with the data; and display on the display the runway including the modified markers and modified aiming point.

In yet another exemplary embodiment, a system within an aircraft including a display, the system comprises a database; and a processor coupled to the display and the database, and configured to store data from a received NOTAM in the database; determine a current position of the aircraft; retrieve visual markings related to a desired flight path from the database; update the visual markings by the processor in response to the data; and display the updated visual markings on the display.

BRIEF DESCRIPTION OF THE DRAWINGS

The present invention will hereinafter be described in conjunction with the following drawing figures, wherein like numerals denote like elements.

DETAILED DESCRIPTION

Figure 1:
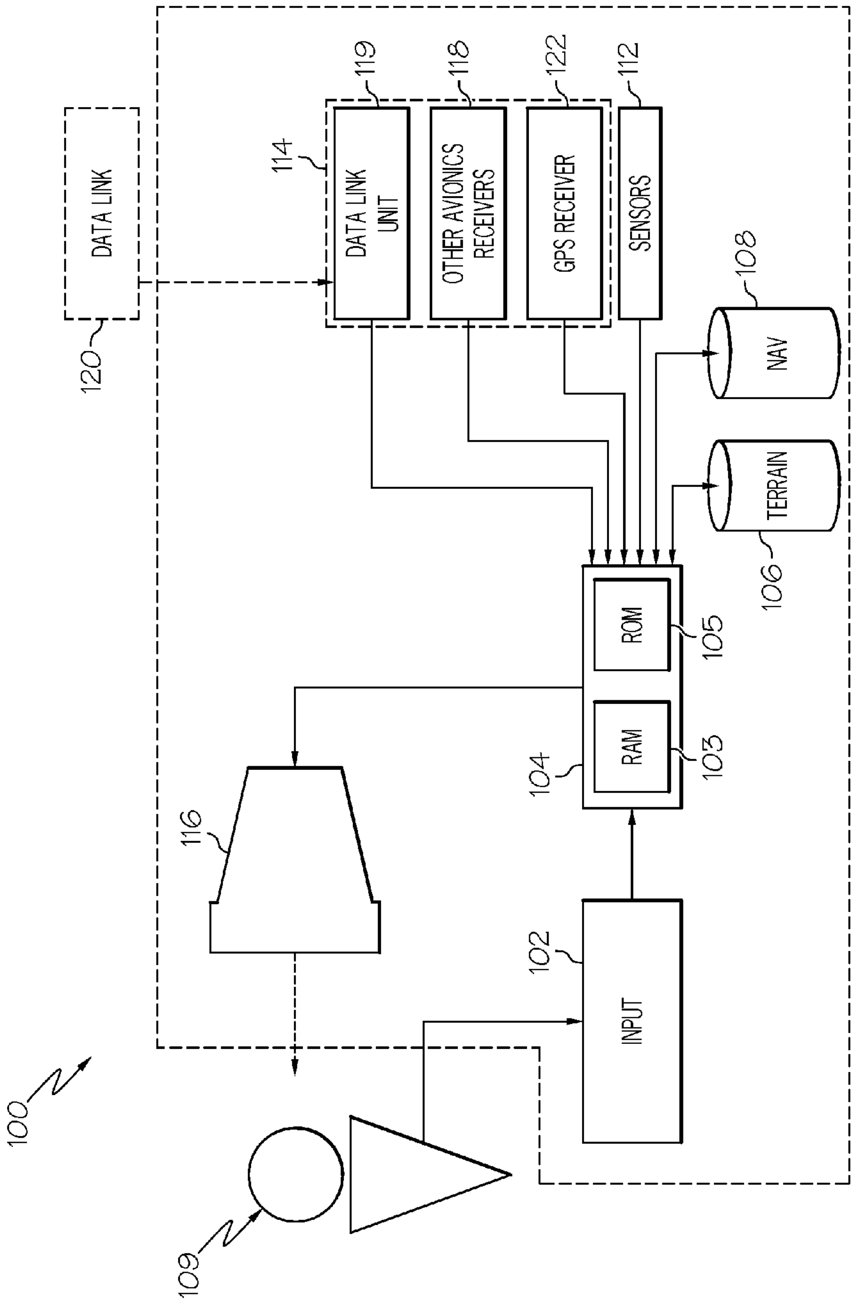
FIG. 1 (PRIOR ART)
FIG. 1 is a functional block diagram of a known flight display system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A system and method are disclosed herein for receiving a NOTAM and storing information relating to the distance of a displaced threshold for a runway. When that runway is selected for approach and landing, the runway including the displaced threshold and a new aim point are automatically displayed. The change made to the display using NOTAM data can be indicated to the pilot by distinct symbology, particular color, or by using an icon or an annunciation.

A NOTAM is filed with an aviation authority to alert aircraft pilots of any hazards en route or at a specific location. While there are several types of NOTAMS, one type disseminates information for all navigational facilities that are part of the National Airspace System (NAS) including all public use airports, seaplane bases, and heliports listed in the Airport/Facility Directory (A/FD), for example, such information as whether or not an airport or a certain facility is usable. NOTAMS may include such data as taxiway closures, personnel and equipment near or crossing runways, and airport lighting aids that do not affect instrument approach criteria.

A digital NOTAM is a dataset that contains NOTAM information in a structured format. It can be fully interpreted by the onboard system without human intervention. It is geo-referenced, temporal, linked to static data, transformable, query enabled and electronically distributable.

One example of an issued NOTAM is for a displaced threshold of a runway. A displaced threshold may be necessary, for example, due to construction off the end of the runway. Knowing the displaced threshold distance, displays, for example, a synthetic vision system, airport moving map, vertical situation display, or interactive navigation, will depict that runway with a displaced threshold markings (or temporary displaced threshold markings) and also update the distance remaining signs accordingly. Distance remaining signs are signs typically on both sides of the runway indicating the distance remaining to the far end of the runway. This distance remaining indication assists the pilot in determining a rate of deceleration after touchdown. An indication to the pilot that the change may be made using NOTAM data through particular color, annunciation, icon or distinct symbology.

Use of distinct symbology to distinguish between a displaced threshold using database values and a displaced threshold from a digital NOTAM is important as the real world (physical) runway detailing does not match the SVS runway marking This is more important in case of Combined Vision Systems where the image from the enhanced vision system is overlaid on the SVS. Also, during transition from head down (SVS) to heads up (visual) the distinct symbology reminds the pilot that the touchdown zone markings on the physical runway should not be relied and it is overridden by NOTAM data.

The database can be updated for the effective period of the NOTAM and all displays are changed as the source data has changed. Alternatively, a temporary overriding database of only the NOTAM indicated changes could be created dynamically and after a record of the same position is fetched from the database, it can be cross checked against the NOTAM database created for updates.

Furthermore, an icon could be placed on the display to depict the NOTAM since the digital NOTAM's are geo-referenced (having known coordinates).

In-serviceable NAV aids could be either removed from the map display or depicted using a different icon based on the NOTAM. Updates issued to Restricted areas or Danger zones could be reflected on the airspace display.

When data is received by NOTAM regarding flight information, for example, a temporarily displaced threshold, a caution and warning system could be updated with the NOTAM data for alerting the pilot. Furthermore, the waypoint of a plurality of waypoints in the flight plan may comprise a unique format for alerting the pilot of modified flight information, for example, a temporarily displaced threshold.

Weather information available through SNOTAMS (NOTAMS affecting airport weather conditions) could be depicted on the Airport moving maps for graphical visualization of airport surface conditions or over laid on the existing weather displays.

Similarly, Automatic Terminal Information Service (ATIS) is a continuous broadcast of recorded non-control information in busier airports. ATIS broadcasts contain essential information, such as weather information, which runways are active, available approaches, and any other information required by the pilots, such as important NOTAMs out of order could be alerted to pilot through crew alerting messages.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring to FIG. 1, an exemplary flight deck display system 100 is depicted and will be described for implementing the present invention. The system 100 includes a user interface 102, a processor 104, one or more terrain/airport databases 106, one or more navigation databases 108, various optional sensors 112 (for the cockpit display version), various external data sources 114, and a display device 116. In some embodiments the user interface 102 and the display device 116 may be combined in the same device, for example, a touch pad. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (not shown), such as a mouse, a trackball, or joystick, and/or a keyboard, one or more buttons, switches, or knobs.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain/taxiway databases 106, the navigation databases 108, and the display device 116, and is coupled to receive various types of aircraft state data from the various sensors 112, and various other environment related data from the external data sources 114. The processor 104 is configured, in response to the inertial data and the avionics-related data, to selectively retrieve terrain data from one or more of the terrain/airport databases 106 and navigation data from one or more of the navigation databases 108, and to supply appropriate display commands to the display device 116. The display device 116, in response to the display commands from, for example, a touch screen, keypad, cursor control, line select, concentric knobs, voice control, and datalink message, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain/taxiway databases 106 include various types of data representative of the surface over which the aircraft is taxing, the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain/taxiway databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain/taxiway databases 106 and navigation databases 108 could also be part of a device or system that is physically separate from the system 100.

The sensors 112 may be implemented using various types of sensors, systems, and or subsystems, now known or developed in the future, for supplying various types of aircraft state data. The state data may also vary, but preferably include data representative of the geographic position of the aircraft and also other data such as, for example, aircraft speed, heading, altitude, and attitude.

The number and type of external data sources 114 (or subsystems) may also vary, but typically include for example, a GPS receiver 122, other avionics receivers 118, and a data link unit 119. The other avionics receivers would include, for example, a terrain avoidance and warning system (TAWS), a traffic and collision avoidance system (TCAS), a runway awareness and advisory system (RAAS), a flight director, and a navigation computer.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein. In particular, the display device 116 can use the flight status data of the host aircraft when rendering the SVS display.

Onboard data link 119 is coupled to external data link 120 and is configured to receive data from ground stations and other aircraft. Examples of the data received include, for example, weather information, traffic information, route changes, and specifically clearances and alerts (including NOTAMS) describing, for example, hazardous situations. In accordance with the present exemplary embodiments, the onboard data link unit 119 receives Automatic Dependent Surveillance-Broadcast (ADS-B) information from external data link 120.

Figure 2:
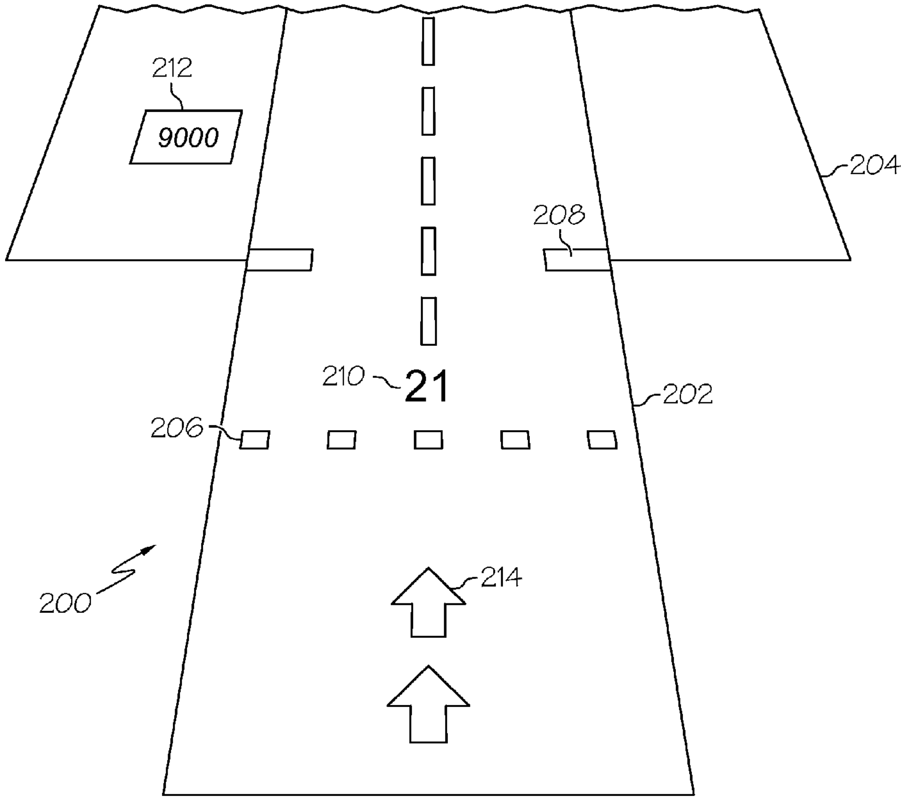
FIG. 2 (PRIOR ART)
FIG. 2 is an exemplary image that may be rendered on the flight display system of FIG. 1.

Referring to FIG. 2, a conventional displayed runway may include several visual markers 200, for example, a runway outline 202, an airport symbol 204, a threshold 206, a touchdown zone 208 (or aiming point), a runway identification 210, runway remaining signs 212, and unusable runway markers 214.

The runway outline 202 around the edges of the runway provides delineation of runway of intended landing along with motion and location cues to the pilot when the range to the runway is not too long. The position, length, and width of the runway are stored in the runway database 110 for a plurality of runways. When a desired runway is selected (on which a landing is to be made), the size of the runway outline 202 is calculated.

The super-sized intended airport symbol 204 is visible on the display screen at large distances from the runway. It emanates from the touchdown zone 208 and provides cues as to where the runway is, perspective cues to the runway, and the location of the touchdown zone. The dynamic sizing of the airport symbol 204 provides motion cues in all dimensions, i.e. up/down, left/right and forward motion flow including sense of ground closure. The size of the runway symbol 204 is determined by software based on the runway size, the altitude and attitude of the aircraft distance to the approaching runway. The symbol size change may not be linearly related to the distance to the runway. Generally, the size of the runway symbol 204 is about up to twice the runway length and about up to six times the width of the runway when close by.

For example, when runway is more than 20 miles away, the runway symbol 204 (box) may be twice the length but more than 10 times the width of the runway in order to facilitate the visual identification of the intended landing area on the display due to perspective view size reduction at distance. As the aircraft flies closer to the runway, for example, at 4 miles, the runway symbol 204 may become six times of the runway width.

The threshold 206 is typically marked with a series of boxes and indicates the start of the usable runway.

The touchdown zone 208 (aiming point) is calculated from the runway database values gathered from the Aeronautical Information Publication and is visible on the display screen at large distances from the runway. It is the "point of reference" of the flight director (FD). The flight director is providing commands to "fly" the flight-path vector symbol to the touchdown zone. The touch down zone symbols include the rendered marking area, e.g., a filled rectangle, on the runway and the leading edge of the runway symbol box centered at the touch down zone.

The runway identifier 210 is a number representing the runway, and is determined by the magnetic heading of the runway. For example, a runway having a magnetic heading of 210 has a runway identifier of 21, or the left runway of two runways having a magnetic heading of 080 would have a runway identifier of 08L.

The runway remaining markers 212 simulate actual signs on the side of the runway that indicate the amount of runway ahead of the aircraft during landing, allowing the pilot to judge the rate of deceleration needed during roll out after touchdown.

Additional visual markers may be displayed (not shown in FIG. 2), for example, an approach course leading up to the runway or a runway texture. Additionally, the visual markers 200 may be color coded.

The system and method disclosed herein automatically updates the display for the pilot with information received in a NOTAM, supporting the pilot's ability to continue a modified flight path to the intended runway. While the NOTAM data described herein relates to a displaced threshold, the NOTAM data may comprise other information related to aircraft safety, including for example, weather, special traffic, restrictions, and airport updates.

Figure 3:
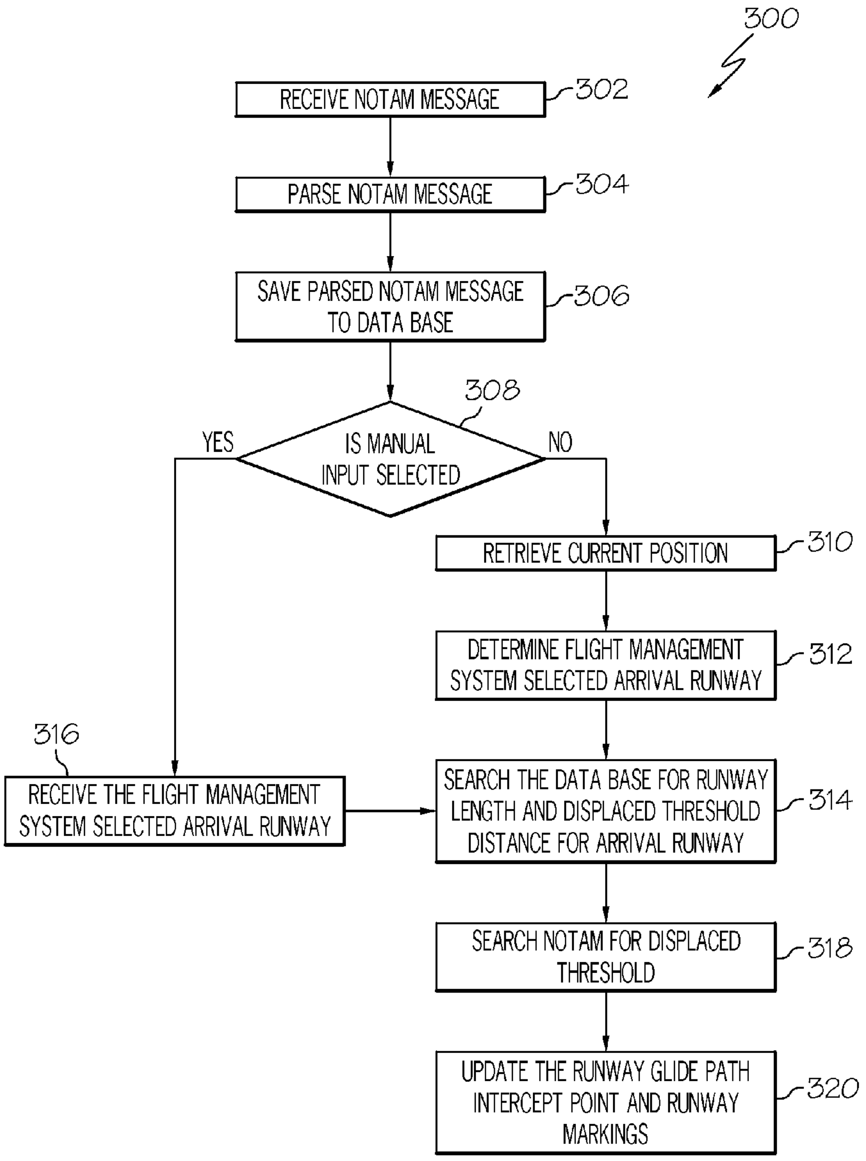
FIG. 3 is a flow chart of a method in accordance with an exemplary embodiment.

FIG. 3 is a flow chart that illustrates an exemplary embodiment of a process 300 suitable for use with a flight deck display system such as the display system 116. Process 300 represents one implementation of a method for displaying aircraft traffic information on an onboard display element of a host aircraft. The various tasks performed in connection with process 300 may be performed by software, hardware, firmware, or any combination thereof For illustrative purposes, the following description of process 300 may refer to elements mentioned above in connection with FIG. 3. In practice, portions of process 300 may be performed by different elements of the described system, e.g., a processor, a display element, or a data communication component. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

In accordance with an exemplary embodiment, the flow chart of FIG. 3 includes receiving 302 a NOTAM message containing information of a displaced threshold. The message typically contains a distance of the displaced threshold from the original threshold. The NOTAM message is parsed 304 and stored 306 in a data base on-board the aircraft. If a manual input is not selected 308, the current position of the aircraft is retrieved 310 from the data sources 114, the flight management system determines 312 the arrival runway, and the data base is searched 314 for runway length and displaced threshold distance using the arrival runway identified in step 312. The stored NOTAM data is searched 318 for a displaced threshold distance and if found, the runway touchdown zone 208, threshold 206, runway identifier 210, and runway symbol 204 are adjusted 320. When a displaced threshold is displayed, the touchdown zone 206 and distance remaining markers 212 are modified, for example, by moving the distance remaining markers 212. When a threshold is displaced temporarily, the touchdown zone and distance remaining markers are modified taking the displaced threshold distance into account.

If a manual input is selected in step 308, the flight management system selects 316 the arrival runway (per a programmed flight plan), and steps 314, 318, and 320 are performed (by omitting steps 310 and 312).

The display of the displaced threshold may be made in one of several ways as depicted by the examples in FIGS. 4-10. When the NOTAM is issued for the displaced threshold of a runway, containing the displaced threshold distance, the display 116 is updated and an indication may be made to the pilot that the change is made using NOTAM data through symbology or in a particular color, or an annunciation or icon on the side of the runway markings, or by a status crew alerting system message.

Figure 4:
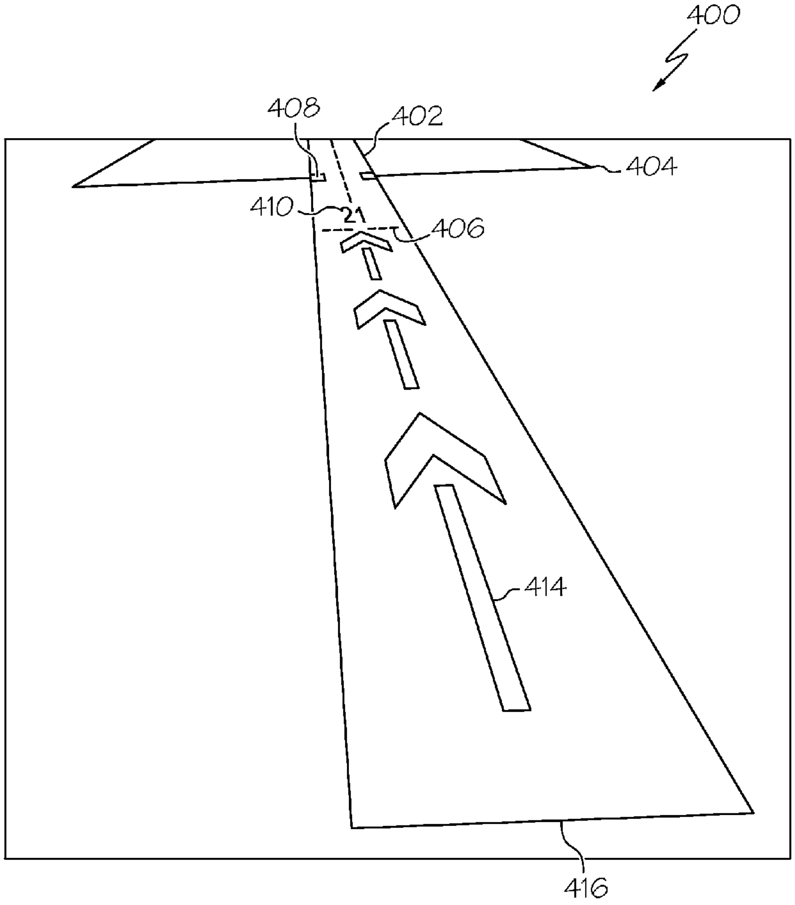
FIGS. 4-8 are exemplary images displayed in accordance with exemplary embodiments.

A first exemplary embodiment of the display of the displaced threshold 406 shown in FIG. 4 includes arrows 414 (using typical SVS symbology) stretching from the actual end 416 of the runway 404 to the threshold 406. Each of the visual markers 400 including a runway outline 402, a runway symbol 404, a threshold 406, a touchdown zone 408 (or aiming point), a runway identification 410, and arrows 414 are repositioned with regard to the displaced threshold 406, and an annunciation is displayed to indicate the NOTAM in effect.

Figure 5:
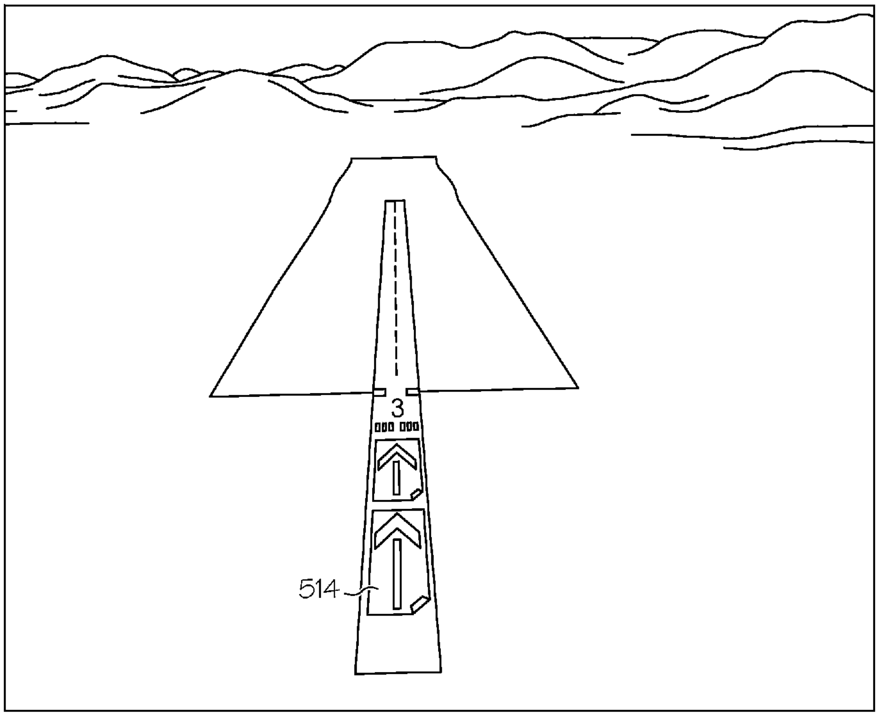
Figure 6:
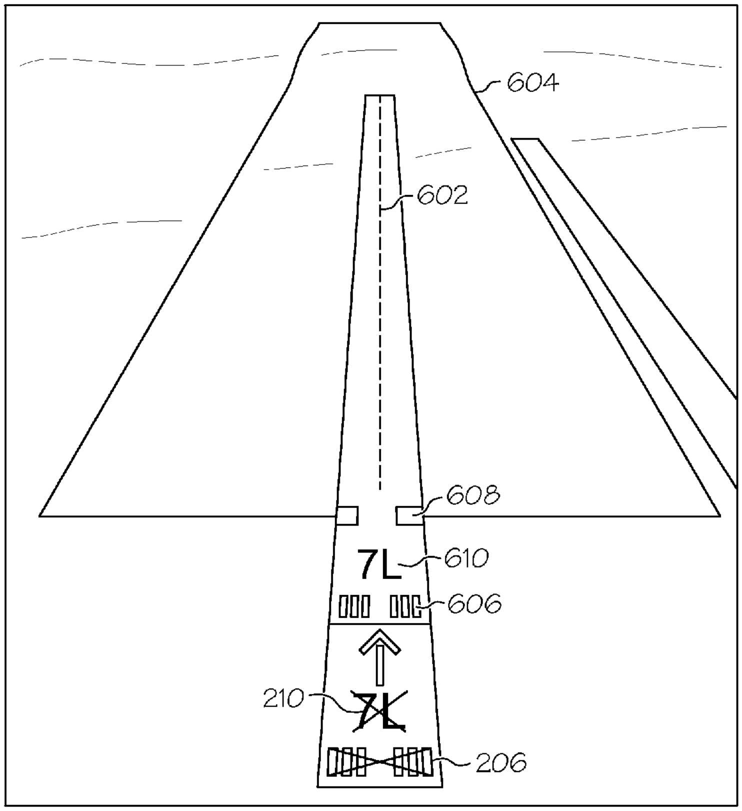

The displaced threshold in SVS and 3D Advanced Motion Measurement (AMM) updated via NOTAM may be displayed using symbology different from that used for displaying displaced thresholds taken from database values. A second exemplary embodiment of FIG. 5 shows the arrows 514 encased in a note. A third exemplary embodiment of FIG. 6 has the original threshold 206 and runway identification 210 modified, for example, crossed out or deemphasized in some fashion, with the repositioned displaced threshold 606, runway identification 610, and touchdown zone 608 displayed. The runway outline 602 and runway symbol 604 are moved to coincide with the new touchdown zone 608.

Figure 7:
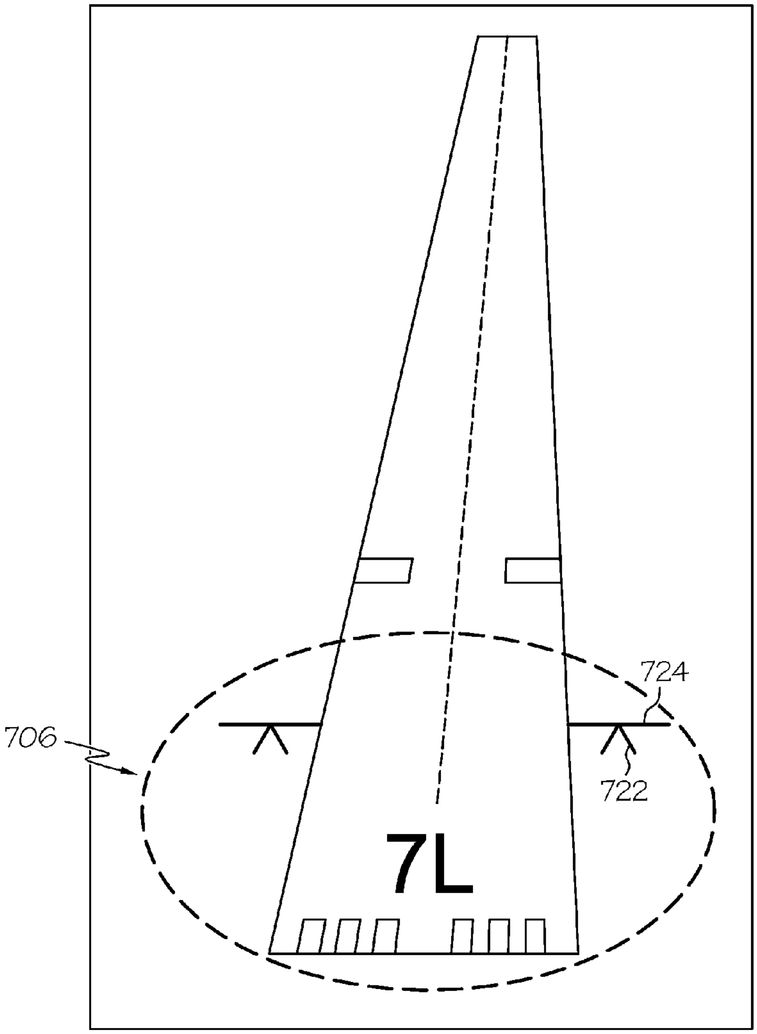
Figure 8:
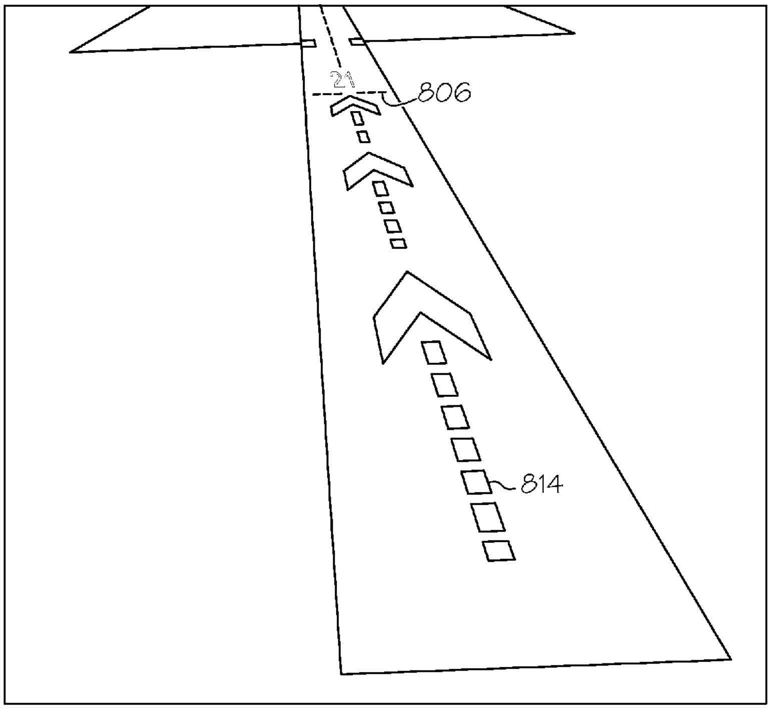

Referring to FIG. 7, the displaced threshold 706 is indicated by the display, on one side or preferably on both sides of the runway, with arrows 722 and a line 724. The displaced threshold 806 in FIG. 8 is emphasized by arrows 814, being dashed to differentiate them from indicating a non-displaced threshold.

Figure 9:
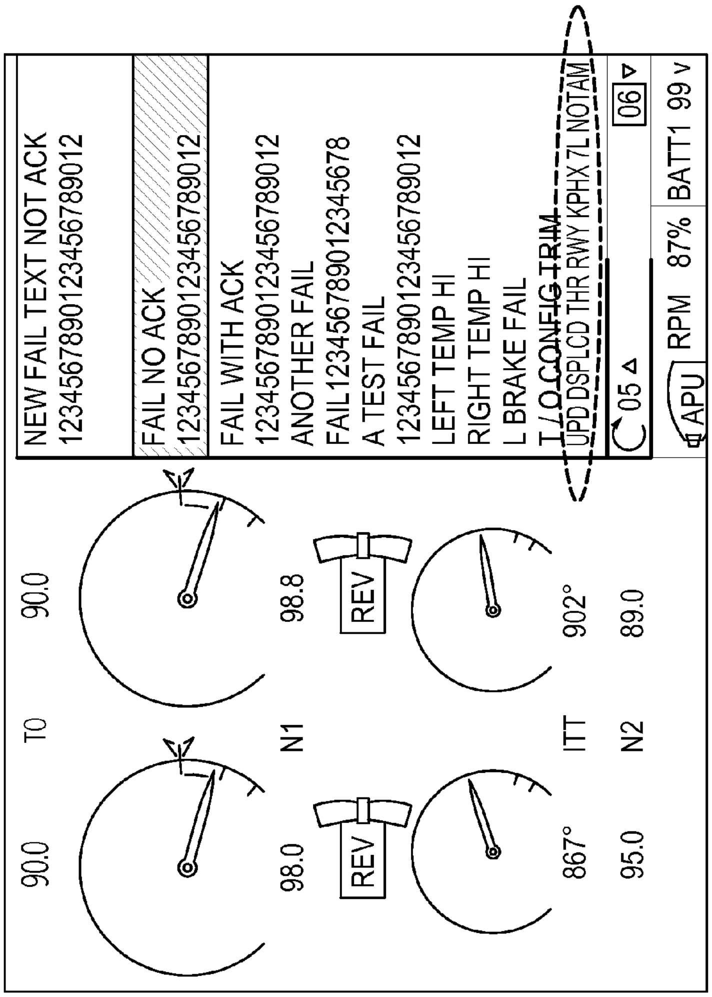
FIG. 9 is an exemplary image displaying a NOTAM in accordance with an exemplary embodiment.

Referring to FIG. 9, the NOTAM information may be supplied in text format. For example, "UPD DSPLCD THR RWY KPHX 7L NOTAM" indicates that an update has been issued of a displaced threshold at the Phoenix airport (sky harbor) runway 7L by NOTAM.

Figure 10:
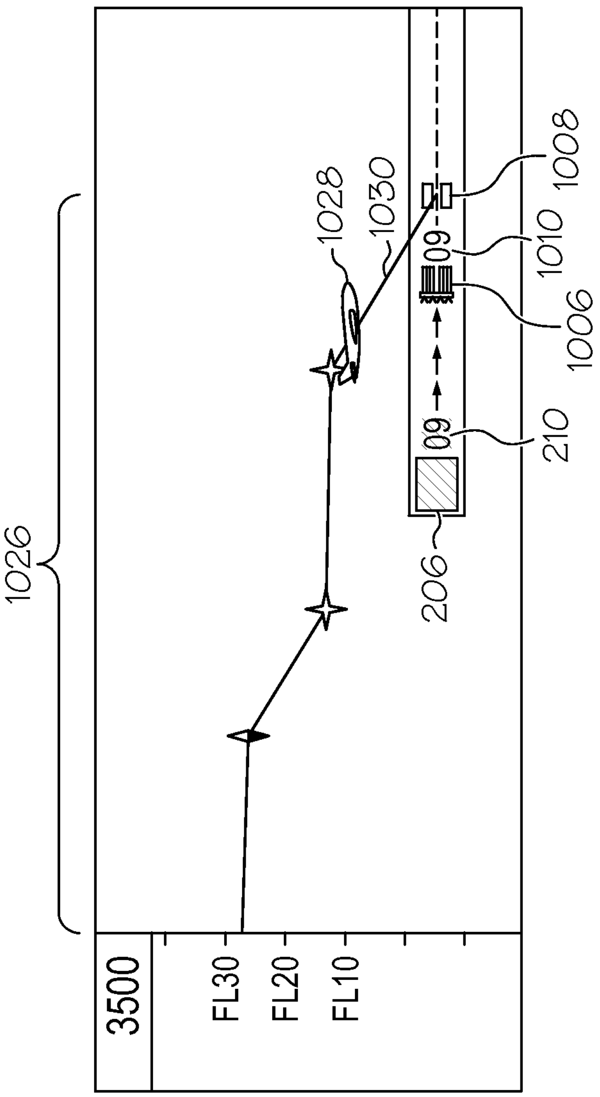
FIG. 10 is a side view of a flight plan modified in accordance with an exemplary embodiment.

FIG. 10 shows a combined top view and a side view of a displaced threshold 1006, the repositioned runway identifier 1010, and touchdown zone 1008, along with the original threshold 206 and runway identifier 210. The side view (profile) of the flight path 1026 for the aircraft 1028 is shown, with the last leg 1030 of the flight path 1026 ending at the touchdown zone 1008.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of displaying information on a display of an aircraft, the information including a runway and a runway threshold, the method comprising:

receiving a notice to airmen data indicating a modification in the position of the runway threshold;

storing the notice to airmen data;

determining a location of a displaced threshold in response to the notice to airmen data;

displaying the runway in a first format specified in a database; and displaying the runway threshold in the first format specified in the database, and the displaced threshold in a second format in response to the notice to airmen data.

2. The method of claim 1 further comprising:

determining an aiming point on the runway for the aircraft in response to the notice to airmen data; and displaying the aiming point in the second format.

3. The method of claim 1 wherein the information further comprises markers indicating the position of the runway threshold, and wherein the method further comprises:

determining a location of revised markers in response to the notice to airmen data; and displaying the revised markers in the second format.

4. The method of claim 3 wherein the information further comprises distance remaining signs, and the method further comprises:

determining modified distance remaining signs with regard to the temporarily displaced threshold in response to the notice to airmen data; and displaying the modified distance remaining signs in the second format.

5. The method of claim 1 wherein the processor in part of a flight management system.

6. The method of claim 1 further comprising:

updating a caution and warning system for the temporarily displaced threshold.

7. The method of claim 1 wherein the displaying step comprises:

de-emphasizing the first format with respect to the second format.

8. The method of claim 1 further comprising:

displaying a waypoint symbol in a flight plan which is closest to the runway with symbology different from other displayed waypoint symbols in response to the notice to airmen data.

9. A system within an aircraft, the system comprising:

a database;

a display; and a flight management system coupled to the database and the display, and configured to:

store data from a received notice to airmen;

select a target runway having markers indicating the location of a runway threshold, and an aiming point on the runway for the aircraft in performing a landing;

determine the positioning of modified markers, and a modified aiming point to be displayed in accordance with the data; and display on the display the runway including the markers in a first format, and the modified markers and modified aiming point in a second format, the first format also being deemphasized from the second format.

10. The system of claim 9 wherein the modified markers indicate a temporarily displaced threshold.

11. The method of claim 9 wherein the modified markers comprise arrows overlaid on a note.

12. A system within an aircraft including a display, the system comprising:

a database including information related to the position of a runway and a runway threshold; and a processor coupled to the display and the database, and configured to:

store data from a received notice to airmen indicating a modification in the position of the runway threshold in the database;

determine a location of a displaced threshold in response to the notice to airmen data;

display the runway; and display the runway threshold in a first format and the displaced threshold in a second format, the first format also being deemphasized from the second format.

13. The display system of claim 12 wherein the processor is further configured to:

determine an aiming point on the runway for the aircraft in response to the data.

14. The display system of claim 12 wherein the visual information comprises markers indicating the position of the threshold and an aiming point for landing the aircraft, and the processor is further configured to:

determine a location of a plurality of revised markers; and determine a location of the revised aiming point; and display the revised markers and aiming point.

* * * * *